(12) United States Patent
Cameron (10) Patent No.: US 6,996,983 B2
(45) Date of Patent: Feb. 14, 2006

(54) STIRLING ENGINE

(76) Inventor: Michael John Vernon Cameron, 125 Middle Head Road, Mosman, New South Wales, 2088 (AU)

( * ) Notice: Subject to any disclaimer, the term of this patent is extended or adjusted under 35 U.S.C. 154(b) by 0 days.

(21) Appl. No.: 10/488,053

(22) PCT Filed: Aug. 27, 2002

(86) PCT No.: PCT/AU02/01151

§ 371 (c)(1),
(2), (4) Date: Aug. 17, 2004

(87) PCT Pub. No.: WO03/018986

PCT Pub. Date: Mar. 6, 2003

(65) Prior Publication Data

US 2005/0000213 A1     Jan. 6, 2005

(30) Foreign Application Priority Data

Aug. 27, 2001   (AU) .................................... PR7268

(51) Int. Cl.
    *F01B 29/10*   (2006.01)
(52) U.S. Cl. .......................................... 60/517; 60/521
(58) Field of Classification Search .................. 60/517, 60/519, 521, 526
    See application file for complete search history.

(56) References Cited

U.S. PATENT DOCUMENTS 4,455,825 A * 6/1984 Pinto ............................ 30/517

6,195,992 B1   3/2001 Nommensen
6,606,860 B1 * 8/2003 McFarland .................... 60/648

FOREIGN PATENT DOCUMENTS

WO    WO 93/20333 A    10/1993
WO    WO 94/21917 A     9/1994

OTHER PUBLICATIONS

Copy of International Search Report (PCT/AU02/01151) dated Oct. 15, 2002.

* cited by examiner

*Primary Examiner*—Hoang Nguyen
(74) *Attorney, Agent, or Firm*—Morgan & Finnegan LLP (57) ABSTRACT

A rotary Stirling-type engine (100) having a heat chamber (105) with a compressing turbine (107) at one end and a valve assembly (108) through which gas enters the heat chamber (105). At the order end is a nozzle housing (109) for gas exit. A shaft (110) extends from the turbine (107) and is mounted in a bearing (111). Another shaft (112) extends from the nozzle housing (109), mounted in bearing (113). A rotor flywheel (114) is also mounted on shaft (110) and fixed in place by socket pin (115). The engine also contains insulating jacket (120), regenerating a housing (122) and a heat sink (126). In the engine, gas is compressed by the turbine (107) until it opens valve (108). The passes through and expands in the heat chamber where it receives heat radiation (eg. Solar) through a glass window (121). The gas cannot escape back through the valve (108) but rather through two circumferentially mounted nozzle adjusters, spinning the whole central assembly, including the compressing turbine (107), as it escapes. The gas then passes over heat sinks (126 and 130) which releases the heat to the external environment.

13 Claims, 6 Drawing Sheets

STIRLING ENGINE

FIELD OF THE INVENTION

The present invention relates generally to devices for generating rotational torque or electrical power, and more specifically to regenerative heat engines—those which utilise the Carnot heat cycle and variations in gaseous pressure, caused by an external heat source. These are broadly identified as 'Stirling Engines'.

BACKGROUND ART

Stirling engines have been in existence for well over a hundred and eighty years, being conceived as a safer alternative to the Steam engine, but they have never attained truly widespread usage. This is generally held to be because of the advent of the Otto internal combustion engine shortly afterward, which generated more power per unit weight, and had easy throttle control, utilising the burning of fossil fuel. Due to environmental concerns and depletion of oil, alternatives to the Otto engine are being sought. The Stirling engine is now resurfacing as a favoured option because of its ability to utilise any external heat source for its power including solar energy, and its potential for high efficiency.

The essential principle of the Stirling engine has been one of creating a cycle in which a gas is consecutively heated at constant pressure, physically expanded, moved to the cooling section, cooled at constant pressure and physically compressed ready to be moved and heated again as the cycle continues. The power stages are the two constant pressure stages, during which heat is either added or taken from the working gas, which causes its volume to increase or decrease, causing a tight fitting power piston to move out or in, in order to maintain constant pressure. Some of the power generated in these two stages is typically stored in a flywheel, the momentum of which is used to physically expand or compress the gas in the other two stages. It also is used to move the gas from the hot end of the engine to the cold end and back, usually by displacing it with a very loose fitting piston, which allows the gas to move around it. The remainder of the power is available for doing work on an external load.

An important feature of the Stirling engine is the regenerator, which sits in the gas flow between the hot end and the cold end. Its function is to take some of the heat from the gas as it is being displaced from the hot end to the cold end, thus reducing the amount of cooling required to attain a low cold end temperature. It then releases this stored heat as the cooled gas is flowing past it again on the way to the hot end, reducing the amount of heat input required to attain a high hot end temperature.

Workings of a Standard Stirling Engine

The following will describe the workings of a conventional Stirling engine. In FIGS. 1A, 1B, 1C and 1D, a section view of a conventional Stirling engine is shown in its four basic stages. In these views, the displacement piston 12 can be taken to be also a simple regenerator, since it sits in the gas flow, and can absorb and re-release heat provided it is made from a thermally conductive material. The hot end 13 of the displacement cylinder 12 is directly above the flame 14, and the cold end is near the heat sink fins 15. A flywheel 16 is shown connected to the two pistons via a crank-shaft 17 and two crank arms, which are shown complete for the sake of clarity even when they occupy a space in front of the section plane. During stage 1, shown in FIG. 1A, the gas is displaced away from the heat sink region 15 cold end, and is being heated in the hot region 13. This causes the gas to expand to a larger than normal volume, expanding past the displacer piston 12 to drive up the power piston 11—which is the only available means of increasing the total internal volume of the gas. This is known as Isothermal expansion, since the temperature and pressure is maintained by an expansion in volume.

During stage 2, shown in FIG. 1B, The energy produced in stage 1 is stored in a flywheel 16, and some of it is used to drive the displacer piston 12 down, now progressively reducing the temperature of the gas to a median temperature, as some of the gas begins to be cooled at the heat sinks 15. If the power piston 11 was not connected to the crank-shaft, it would also decline in response to this, but it can't because flywheel energy is also used to move the power piston against its natural trend to a higher position, which physically expands the gas. This stage is therefore called adiabatic expansion, since it expands due to a means other than heat input.

During stage 3, shown in FIG. 1C, the displacer 12 is now at the hot end 13, forcing most of the gas to the cold end 15, causing temperature and pressure to fall, and therefore the volume to decrease. This sucks the power piston 11 down again. This stage is called isothermal compression.

During stage 4, shown in FIG. 1D, the energy stored in the flywheel 16 is used to move the displacer 12 away from the hot end 13, allowing the cooled air to be heated back to the median temperature. Without the crank shaft 17 and flywheel 16, the power piston 11 would move back up as a result, but it is instead forced further down, causing a net physical compression of the gas by the piston. This stage is called adiabatic compression.

Major Categories of Stirling Engines

Many types and configurations of Stirling engines have been developed apart from the single piston version described above. In broad terms, there are at present, three main classifications. Alpha engines use two tight fitting, crank connected pistons to move gas back and forth with a regenerator in-between. Beta engines (like the one described above) use a single power piston and a displacer piston in essentially the same cylinder, again connected by a crank shaft. Gamma engines have no physical phase connection between the displacer and the power piston, but use springs and dampeners to create a natural frequency in the system, which facilitates an appropriate phase relationship between them.

Others sub classifications include hydraulic, diaphragm and acoustic systems. Generally, Stirling engines rely on a piston/crankshaft arrangement or something similar to deliver the power from the back and forth motion of the piston to the rotary motion of the output drive. Linear alternators have also been employed in some systems to achieve the same basic result: power output from linear reciprocal motion.

Efficiency of a Stirling Engine

The efficiency of a Stirling engine depends upon a number of factors. First of all, the temperature difference between the hot end and the cold end of the engine defines the theoretical limit of efficiency of the engine according to Carnot's equation:

Max Efficiency %=(1−Tc/Th)×100 in which temperatures are in Kelvin, not Celcius, and Tc is the temperature of the cold end of the engine while Th is the temperature in the hot end.

As can be seen from this, as Th increases or Tc decreases, or both, the efficiency approaches 100%. For this reason, extreme temperatures are required for highest efficiency. If Th is around 873 K 600 C and the Tc is roughly ambient 298 K or 25 C, then the maximum efficiency possible would be around 66%. By contrast, the internal combustion engine has a theoretical limit of less than half of this efficiency. It is a fundamental aspect of Carnot's theory that 100% efficiency is impossible as heat flow out of the engine is an essential part of the engine's function. However, it is widely recognised that higher efficiencies are possible in this type of engine than in any other.

From this it can be seen that the theoretical efficiency limit is not the main obstacle to the use of these engines.

Limits to Efficiency

With regard to temperature difference, it is true that the more extreme the temperature used, the greater the insulation required to prevent heat loss—in an exponential, power-4 relationship. Material limitations come into play here, as high temperature metals and insulators are typically exotic and expensive.

A limit to efficiency in the conventional Stirling Engine is the proportion of gas which is never heated or cooled properly because it is not fully displaced, or is trapped somewhere where it cannot be cooled or heated. This is known as dead-space. The proportion of dead space further reduces the efficiency of the engine.

Because the gas is proportionally heated and cooled according to the position of the displacer, when the displacer is anywhere in between its maximum and minimum points, a certain proportion of gas is being cooled while the rest is being heated or vice versa. Because the cycle is rotational in nature, there are only two instants of the cycle in which the gas is all being cooled or all being heated except for the dead space, and therefore only two points at which the forces are not to some extent cancelling each-other out. This leads to reduced efficiency due to a partial cancellation of forces. One way that piston based Stirling engines are being improved in this regard, is by using two mating elliptical gears, which mean that when one is turned at a constant rate, the one it is driving is turning at a variable rate, slowing down at two points in the cycle. This results in the displacer staying longer at both the hot end and the cold end of the cycle, and spending less time in-between. Of course, the ultimate solution would be if there were no need to spend any time in-between, if the air at the hot end was constantly expanding, and the air at the cold end was constantly contracting, with no time lag in-between.

Another related limit to efficiency is the degree to which the gas is heated or cooled in the cycle due to the time allowed. Stirling engines have typically rotary speeds of up to 50,000 rpm, in which case the gas has less than 0.0012 seconds to exchange its heat. This means that there is a minimal exchange of heat in the gas, causing the engine itself to heat up and lose energy to the surroundings without doing work. This reduces the efficiency of the engine.

Another limit to efficiency is air friction as the gas moves to and fro past the displacer. Here we can see that in a Beta displacer type engine, there is a conflict between air friction and dead space efficiency requirements. The more tight fitting the displacer piston, the less dead space, but the more air friction. Air friction increases exponentially with air speed over an object, so this factor becomes more and more important as the rpm of the engine increases.

A major limit to efficiency of existing Stirling engines is the piston/crank arrangement. Careful study of the direction of resultant forces in this arrangement shows that there are transverse component forces acting during rotation, which are pushing the piston arms sideways into the bushings, causing increased friction. There is also a component of force acting directly on the crankshaft rather than tangentially. Only for two brief instants, shown in FIG. 1A and FIG. 1C, is the component of force tangential and acting completely to produce rotational moment. From these two points, the force reduces to zero at stages shown is FIGS. 1B and 1D—where there is no rotational moment in the force whatsoever. It is true that these points generally coincide with points in the cycle when it is primarily energy stored in the flywheel, which carries the two pistons back or forth. However, it remains that even within the two power stroke segments of the cycle—A and C, there are only two brief instants when almost all the force is actually being transmitted into the crank shaft. For most points of the power strokes, there are large components of counter-productive transverse forces. This wastage of forces is great enough to appreciably affect engine efficiency. The effect of these inefficiencies is important in the Stirling Engine, because they affect the power to weight ratio of the engine, and therefore the power to cost ratio, both of which place limitations on the useful applications for the technology.

The fact that these inefficiencies have not yet been overcome is attested by the limited applications in which these engines are currently used. At the time of writing, their main applications are in Submarines, due to their quiet running nature, with a limited application also as on board generators for boats. Much research is underway for engines to be used in power generation from solar, but there are only a few such power plants in operation, and more widespread application of these engine types is not assured with available technology.

DISCLOSURE OF THE INVENTION

The invention is a Stirling engine comprising a heat chamber and heat sink filled with working gas, and a drive shaft, the engine being powered by an external heat source to utilise the Carnot heat cycle and variations in gaseous pressure to drive the shaft in rotation; and where the engine further comprises a compressor mounted on the drive shaft to move working gas from the heat sink into the heat chamber, and an outlet to release working gas from the heat chamber to the heat sink, the outlet being mounted on the drive shaft and directed such that the action of the released gas is substantially tangential to the axis of rotation of the drive shaft, to drive it in rotation and so rotate the turbine and do useful work.

The proposed invention may overcome many of the above inefficiencies through the employment of a circulatory approach to gas movement (rather than back and forth), by using a turbine rather than a displacer, and by adopting a direct rotary approach to power transfer from the working gas to the drive shaft.

The compressor may employ triple helical spiral of reducing radius.

There may be a valve located between the compressor and the heat chamber. As the pressure inside the valve exceeds the pressure inside the heat chamber the valve opens to feed the gas into the heat chamber. The increase in temperature and pressure in the gas as soon as it is injected into the heat chamber closes the valve.

The heat chamber may also be mounted on the drive shaft to be driven in rotation. In this case the outlet may be formed in a wall of the heat chamber.

The gas that has been released from the outlet passes over the heat-sinks which extract heat from the gas and release it to the outside environment.

It is possible to improve the efficiency of the cycle further by incorporating a regenerator to cool the gas as it proceeds to the heat sink, and warm the gas as it returns from the heat-sink towards the turbine.

Springs may serve to tension the outlet closed, and thus to allow a build up of pressure before it opens and a pressure drop once it opens.

Heat shields may be used to keep as much heat as possible inside the heat chamber.

A window may be provided in the engine to allow heat to radiate onto the heat chamber. The window may be located at the focal point of a solar concentrating dish.

Helium may be used as the working gas. Helium is advantageous since it is largely inert, and expands and contracts further per unit heat energy in or out than is the case with most other gasses apart from Hydrogen, which has safety issues.

The engine may be used to power a generator. Alternatively the drive shaft may extend to provide a mechanical coupling. In another variation the shaft may employ a magnetic coupling.

While heat loss will always be an issue in Stirling type engines, this design reduces the problem. This is because heat that is on its way out of the engine without doing work, has to pass through a continuous flow of cooled working gas before it can do so. Inevitably, much of the heat that would have been lost is thus recaptured. It is recaptured at the right point in the cycle, after the cooling stage, where added heat contributes to making the hot side hotter, thus improving efficiency.

This design essentially doesn't have any dead space because all of the gas in the heating chamber is heated, and all of the gas going past the cooling fins is cooled. All of the gas sequentially goes through all of the stages because the gas moves in a circulating fashion past every stage instead of a reciprocating fashion back and forth, in which the middle gas molecules never get fully heated or cooled, because they are not fully displaced.

With regard to cancellation of forces, this design overcomes the problem because the cold side is constantly cooling, while the hot side is constantly heating. The nozzle system is always directly in-between these two extremes, experiencing both the full positive pressure of expanding gas at the hot side, and the full negative pressure of contracting gas at the cold side, at the same time. Therefore the forces are never cancelling each-other out, and are not varying in a sinusoidal way, but rather are constant and maximal.

Figure 1:
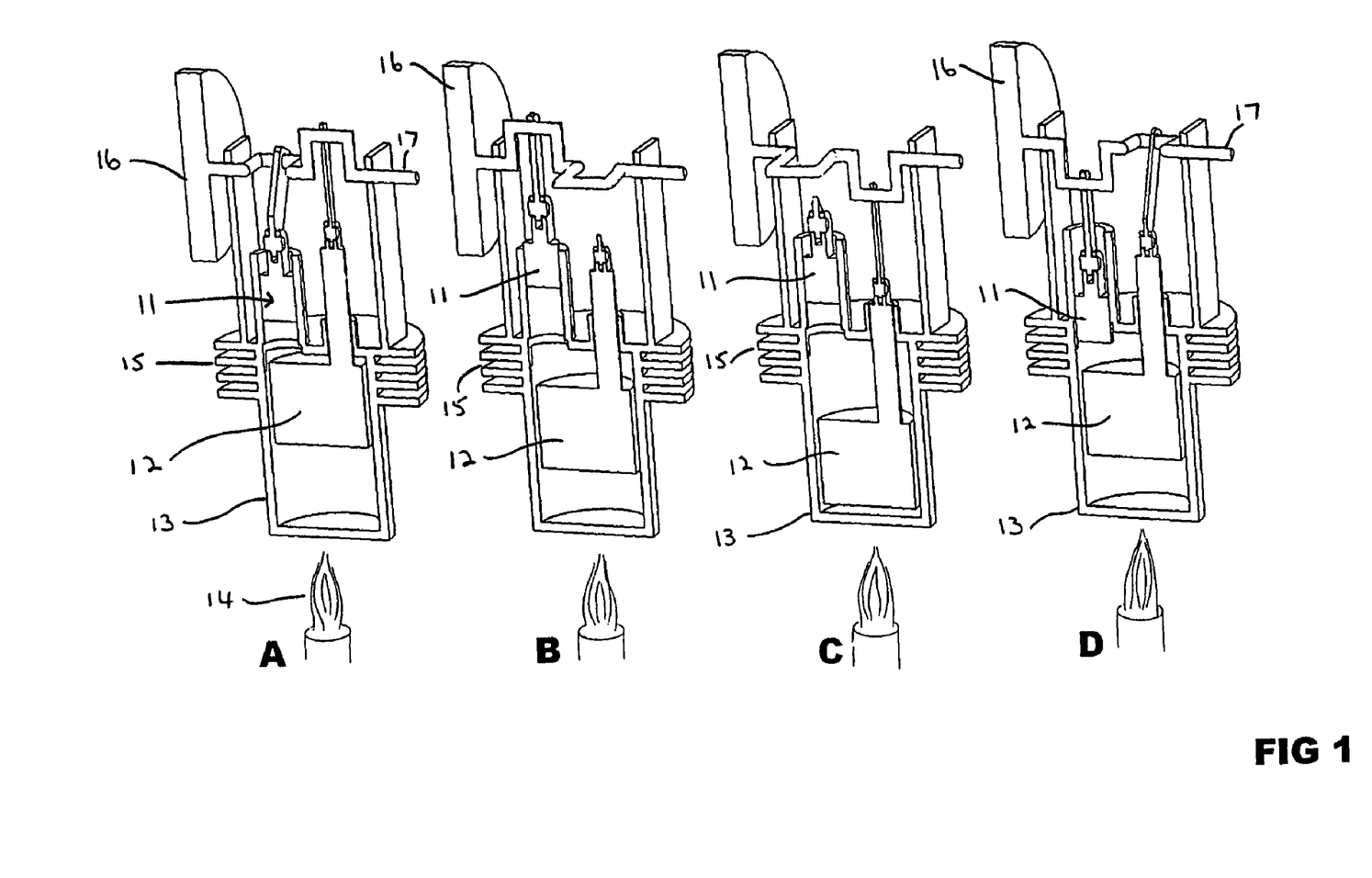

With regard to the time allowed for heating and cooling of the gas, this design maximises this period because it is concurrently heating and cooling the gas at any point in time. This is because the gas is continually circulating past the hot and the cold regions at any given point in time. In a conventional Stirling engine, the position of the displacer piston determines whether the engine is in a heating or cooling stage, as shown in FIG. 1. When it is near the heat source, most of the air is displaced from there and being cooled at the fins. When it is near the fins, most of the air is displaced from there and being heated near the heat source. Therefore, in the ideal case of a piston Stirling engine, in each cycle time the air has half the time to heat, and half the time to cool. In reality it has much less because part of the cycle is actually neutral as the cycle passes between heating and cooling—generally in a sinusoidal way. In this design, the gas experiences the whole cycle time of cooling, and the whole cycle time of heating, in a linear maximal—non-sinusoidal way, all within one cycle time. This means that much more of the energy will be directed to performing useful work, and less will be lost as heat in the engine itself.

There is less air friction in this design, firstly because the air has to move at only half the speed, since it has double the time to complete a cycle for reasons mentioned earlier. It is also reduced because there is no necessary conflict between dead space and air-flow requirements, since dead space is really not an issue. This means that the air can flow freely in relatively open space, whilst still engaging in effective heat exchange, thus reducing air friction.

Probably one of the most significant advantages of this design is the fact that the force exerted by the gas always acts tangentially, or very close to tangentially, to the rotary motion, thus utilising vastly more of the force in the same direction. Essentially no component of the force is counter-productive, so friction is minimised, and strain loadings are greatly reduced. As mentioned earlier, a crank-shaft is a rather inefficient system, which produces a lot of friction and strain due to opposing forces during rotation. Tangential application of forces is the ideal case, because they produce pure torque with no wastage whatsoever apart from the necessary friction in the bearings.

Crank shaft systems also require a lot of bearings—and a lot of movement of metal against metal, producing friction. With reference to FIG. 1, it can be seen that in a Beta type engine, two are required for the crank shaft position, another two for the crank arms to be located on the crank shaft, and two sliding fits where the pistons are centred in their cylinders. Each of these contact points produces friction, which reduces efficiency. Since the shafts and pistons experience significant amounts of lateral strain, the bearings and cylinder bushings need to be strong, and are therefore less likely to be of a low friction type, since low friction bearings tend to be less optimal for sustaining large lateral loadings. They are more likely to be of an oil-fed plane bearing type, which, if requiring an oil pump, will lead to greater complication in the design and more moving parts. This design requires two roller bearings, with some possibility of reducing this to only one. Only one of these sustains any appreciable axial load at all.

BRIEF DESCRIPTION OF THE DRAWINGS

An explanation of the operating cycle of a know single piston Stirling engine is described in the Background Art section with reference to FIG. 1.

An example of the invention will now be described with reference to the following drawings, in which.

BEST MODES OF THE INVENTION

Figure 2:
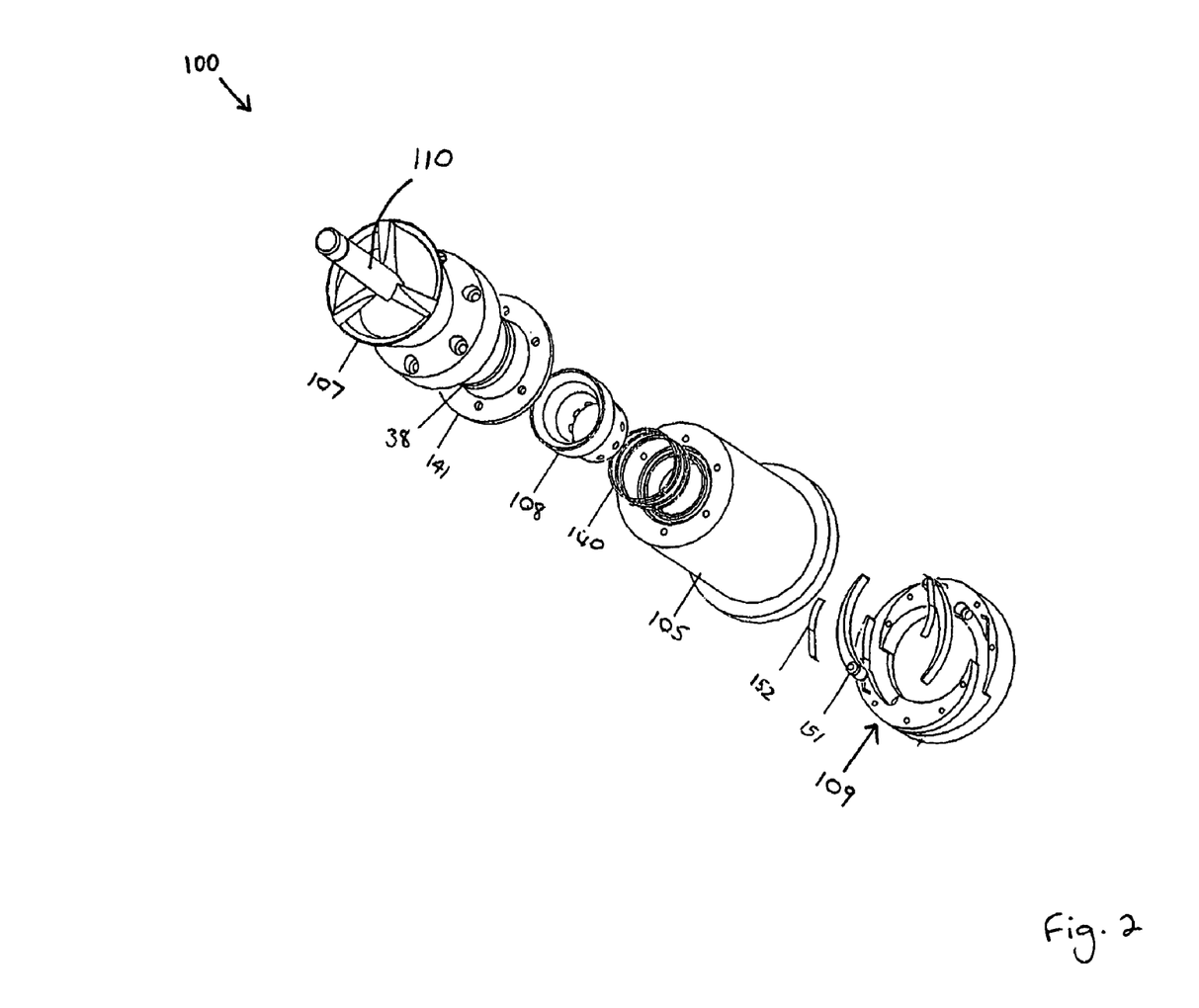
FIG. 2 is an exploded view of the engine showing the internal working parts.
Figure 3:
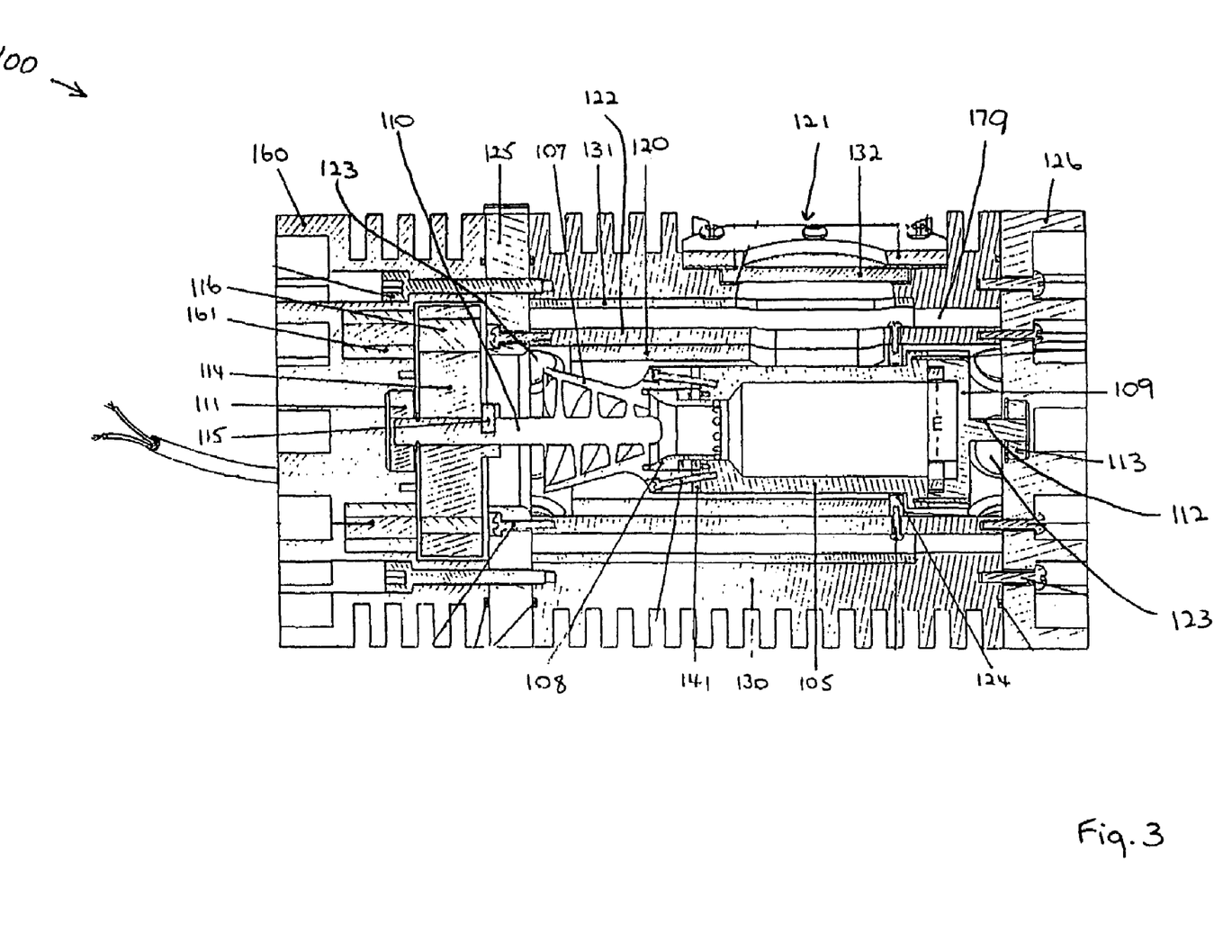
FIG. 3 is a longitudinal section through the engine.
Figure 4:
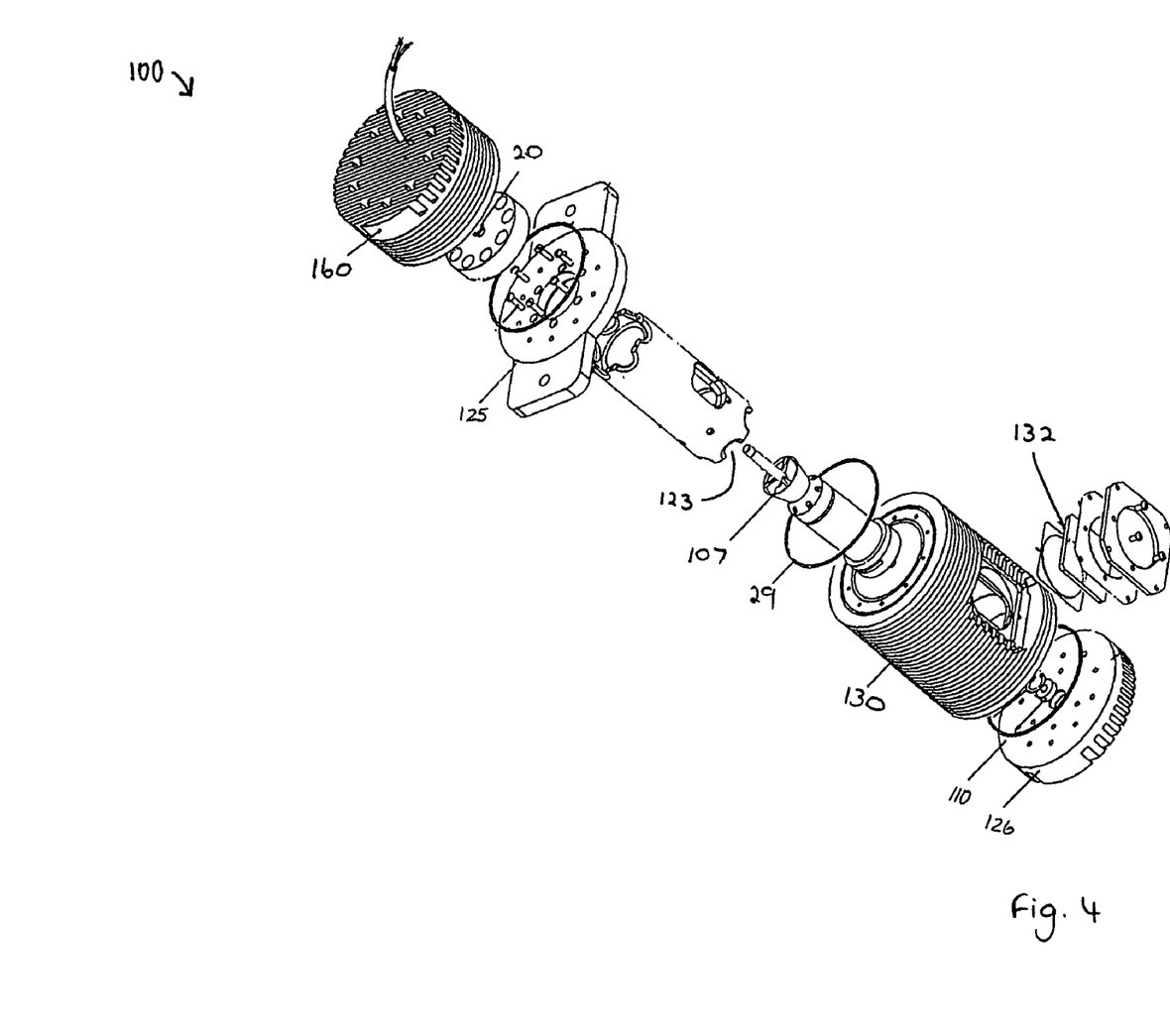
FIG. 4 is another exploded view of the engine.

Referring first to FIGS. 2, 3 and 4 an engine-generator set 100 will be described. The heart of engine 100 is the heat chamber 105 made of black anodised aluminium. At one end of the heat chamber 105 is a stainless steel compressor 107 and valve assembly 108 through which gas enters the heat chamber. At the other end is an aluminium nozzle housing 109 for gas exit. A shaft 110 extends from the trubine 107 and is mounted in a steel single row angular contact bearing 111. Another shaft 112 extends from the nozzle housing 109 and is mounted in a ceramic and steel ball bearing 113. A rotor flywheel 114 is also mounted on shaft 110 and fixed in place by a socket pin 115. A series of magnets 116 are mounted within flywheel 114. This entire assembly is able to rotate.

An inner insulating jacket 120 of 6 mm lytherm surrounds heat chamber 105 and most of the turbine 107, except for an aperture in window region 121. An aluminium regenerator housing 122 surrounds insulation 120 except for an aperture in window region 121. There are a series of openings 123 around both ends of the regenerator housing. An aluminium air blocking ring 124 is screwed inside housing 122 and extends around the heat chamber 105 near the nozzle housing end. A regenerator mounting plate 125 is screwed to one end of the housing 122 by stainless steel screws. An aluminium heat sink 126 is bolted to the other end by more stainless steel screws.

A cylindrical heat sink 130 also extends between the regenerator mounting plate 125 and heat sink 126 and is sealed at both ends by nitrile rubber 'O' rings. Another insulating jacket 131, comprising 3 mm lytherm and a foil skin extends around the interior of heat sink 130. Both heat sink 130 and insulation 131 are apertured in the window region 121. The window region 121 itself is covered by a glass window 132, which is sealed in place.

The valve assembly 108 is spring biased by a helical spring 140 into a closed condition, and a heat blocking gasket 141 is mounted to prevent heat passing it. The nozzle housing incorporates two helical gas outlet paths 150 (see FIG. 5), which are usually kept closed by nozzle adjusters 151 biased closed by leaf springs 152.

An aluminium generator heat sink 160 is screwed to the regenerator mounting plate 125. Inside heat sink 160 there are a series of ferrite cored induction coils 161.

Figure 5:
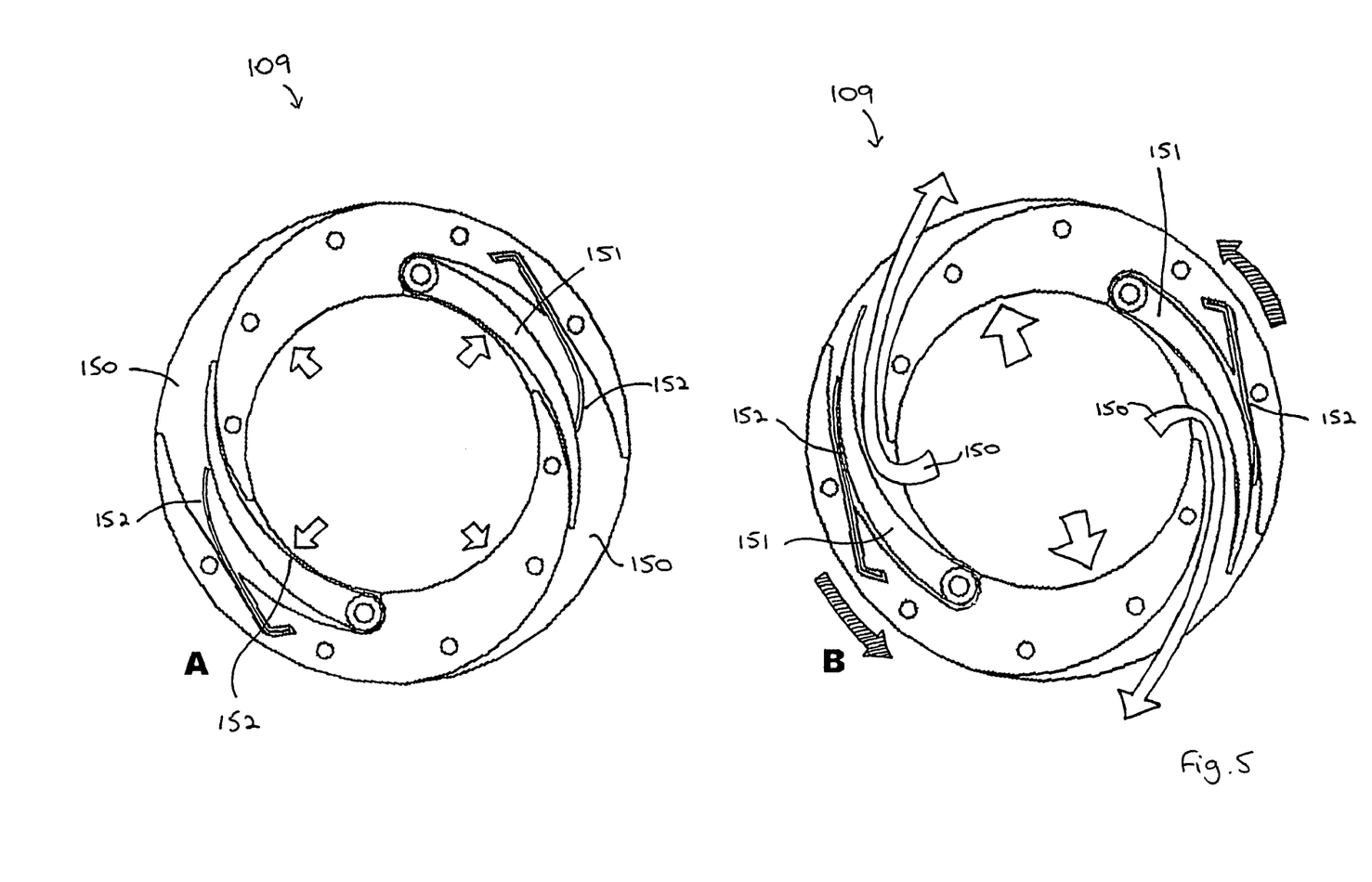
FIG. 5A is a section through the nozzles of the engine in the closed configuration.
FIG. 5B is a section through the nozzles of the engine in the open configuration.
Figure 6:
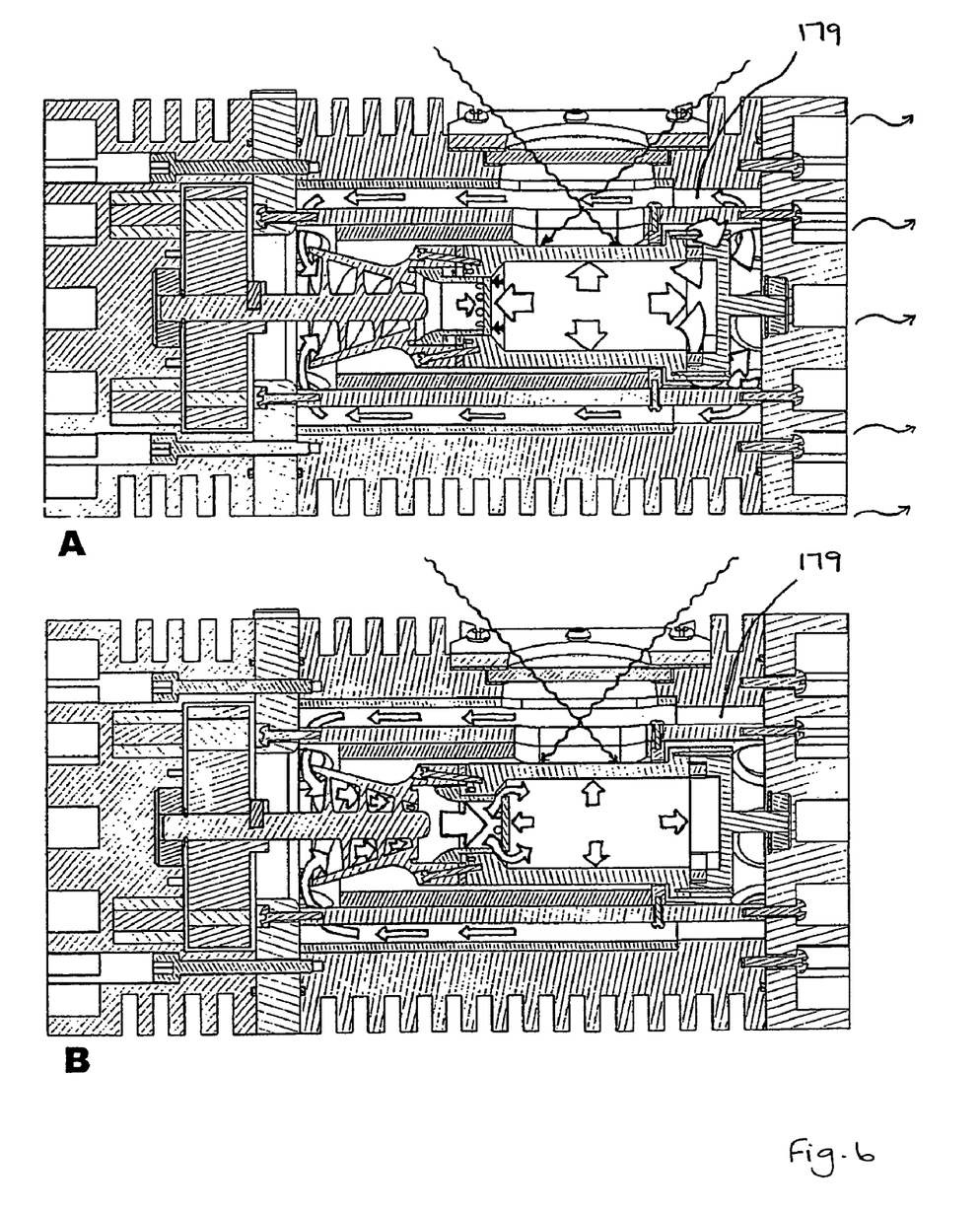
FIG. 6A is a longitudinal section through the engine showing the gas flows when the nozzles are open and the turbine closed.
FIG. 6B is a longitudinal section through the engine showing the nozzles closed and the turbine open.

Referring now to FIGS. 5 and 6 the workings of the invention will now be described as they relate to the four stages of Carnot's cycle, namely Isothermal while being heated expansion, Adiabatic physical expansion isothermal while being cooled compression and Adiabatic physical compression.

Adiabatic Compression

With reference to FIG. 6B, the compressor 107 takes working gas from it's nearby environment compressing it as it rotates at high speed, creating a high pressure region inside the valve 108. As the pressure inside the valve increases, it begins to exceed the pressure inside the heat chamber 105, and moves the valve along into the open position, slightly opposed by the spring 140, which tends to keep the valve in the closed position if there is no difference in pressure. This is the end of the adiabatic compression stage. It is useful to note that this compression stage creates an equal and opposite expansion of the working gas on the opposite side of the compressor, which will be mentioned again when discussing Stage 3.

Stage 2: Isothermal Expansion

As mentioned, when the pressure difference between the valve 108 and the interior of the heat chamber 105 increases, the valve moves relative to the heat chamber, causing the valve to open to the more expansive interior of the heat chamber, allowing pressure release and rapid gas flow into the heat chamber. Because the blackened heat chamber 105 is receiving constant heat input in the form of concentrated radiation, solar for example, through the glass window 121, it is consistently at a very high temperature. Because it is made from a thermally conductive material, and is rotating, the high temperature is transmitted throughout the heat chamber 105, and the transfer of heat to the gas in the chamber is therefore also high. Because of this, there is a near explosive increase in temperature and pressure in the gas as soon as it is injected, which instantly closes the valve 108, pushing it back, hard up against its seat. This means that the gas in the chamber now has only one possible exit—through the two nozzle adjusters 151, which are forced into the open position shown in FIG. 5B. These are designed to create a gas flow which is high velocity, and which is tangential, or close to tangential to the rotational motion of the assembly, to maximize torque. Since the gas is in an isothermal expansion stage, in order to remain at a constant temperature and pressure, its volume must increase greatly. As it does this, its rapid motion through the nozzle adjusters and the nozzle housing 109 creates an equal and opposite reaction moment in the nozzle housing, and therefore the whole central rotating assembly suspended between bearings 111 and 113. At the end of this stage, most of the heated gas has passed through the nozzles, and is on its way towards the heatsinks 126 and 130. As a result of this stage, the linked assembly suspended by the bearings is spinning at high speed.

Stage 3: Adiabatic Expansion

As mentioned earlier, as the gas is escaping from the nozzles, it causes the entire assembly to rotate, including the compressor 107. As shown in FIG. 6, as the compressor rotates, it compresses the gas, which goes inside it, and also equally expands the gas that remains outside, creating a low pressure in this region 179. This low pressure is transmitted to the entire volume of gas outside of the rotating assembly, including the region just outside the nozzles. Here it serves to increase the pressure difference between the gas inside the chamber, and the gas outside, preventing any equalisation effect, which would bring the motion to an end. Since this low pressure has been created by a mechanical means, it is called an adiabatic expansion.

Stage 4: Isothermal Compression

In this stage, the air which has been released from the nozzles passes over the heat-sinks 126 and 130, which extract heat from the air and release it to the outside environment. As the gas loses heat T the pressure P must fall, since the volume can be taken as a constant, according to the gas equation PV=nRT. The volume is taken as constant since the vessel is sealed, and the area outside the turbine is in a steady state in which gas is coming out of the nozzles at the same rate that it is going into the turbine. n is the number of moles of gas, which doesn't alter since it is a sealed system, and R is the gas constant. Because of the negative pressure caused by the turbine, these two negative pressures combine to produce a highly negative pressure just outside the nozzles, which is maintained constantly, and which significantly increases the torque generated by the air escaping from the nozzles. This is because the torque is proportional to the pressure difference—so a high pressure inside, combined with a low pressure outside, will produce a larger torque than it would with just an average outside pressure.

The Regenerator 122

It is possible to improve the efficiency of the cycle further by incorporating a regenerator 122 within the design. The regenerator is essentially an internal heat-exchanger, which is located immediately adjacent to the nozzle output, and extends for a distance in both directions from this point. In this design it traverses the entire internal length of the device. As described earlier, this feature will improve efficiency by increasing the hot side temperature, and decreasing the cool side temperature, leading to an increase the speed and torque of the engine. It also helps to keep sloughing off heat building up in the region around the nozzles, and so keep the pressure low in this region, and the torque high.

The Leaf Springs 152

The leaf springs serve to tension the nozzle adjusters in the closed position, and thus to allow a certain build up of pressure before they open up. This is important because it is pressure difference which provides the power for the device. It is also the moment at which the nozzle adjusters open up that the pressure falls in the heat chamber, allowing the valve to open. If the nozzle adjusters don't create a certain build up of pressure, then they won't produce a sudden fall in pressure when they open, and the opening of the valve may be compromised. It should be noted that many different means may be employed to achieve this net effect, including compression springs, air pressure and so on. The leaf springs employed are merely an example of a means to maintain a high internal pressure in the heat chamber 105, and thus increase the velocity of gas escaping, and the reaction force in the central linked assembly.

The Inner and Outer Heat Shields, 120 and 131

The inner heat shield 120 is made from soft insulation material in the present configuration, but may in other configurations contain reflective material to reflect thermal radiation. Both parts are required to keep as much heat as possible inside the heat chamber, and if it escapes from there, inside the engine as a whole. The inner heat shield 120 acts like a blanket around the heat chamber. In this configuration it is fixed in place with high temperature resistant adhesive, but many other means are possible. The outer heat shield 131 is also soft insulation material, but is coated with a reflective aluminium layer. This part is designed to make sure that any heat picked up by and released by the regenerator stays within the system, being absorbed by the flow of air between the two parts. The aluminium foil serves as a radiation reflector, and the material a conduction blocker. The airflow is a convection diverter of the heat also, which combined with the heat shields mentioned, should effectively reduce heat flow out of the system at stages in which it is not advantageous to efficiency. The heat blocking gasket 141 is designed to prevent the excessive flow of heat from the heat chamber to the turbine and valve. This is mainly necessary because of the potential for heat to travel all the way along the turbine to the bearing and heatsink at the far end of the device, from which there is no means of preventing its escape to the environment.

The Flywheel 114, Magnets 116 and Coils 161

These parts are utilised to convert the rotational torque of the shaft into useful power in the form of electricity. The generator heatsink 160 is required because the production of electrical power in a generator generally results in significant heat production in the coils.

The Regenerator Mounting Plate 125

This part seves the function of providing a place for the regenerator to be fixed to, and to provide fixing points for the whole device, such that it can be positioned accurately. For instance it may be located at the focal point of a solar concentrating dish.

The Air-Blocking Ring 124

This part provides a barrier to air which may otherwise move backwards though the system, short-circuiting the cooling stage which produce useful power.

Sealing Rings

These are designed to prevent the escape of working gas at points at which a joint is necessary, apart from the valve seat, which serves the purpose of minimising noise in the engine, as the valve goes backand forth.

The Compressor 107

The compressor employs a triple helical spiral of reducing radius, which takes air in at a great rate, but delivers it into a very confined space, thus compressing it. Many other different configurations of turbine are possible.

The Nozzle System 109, 151, 152

The nozzle system is also a new development in itself, firstly in that it is a system which self regulates the valve opening according to the pressure inside the heat chamber, springs 152 to tension the nozzle adjusters in the closed position. This means that the system is able to build up enough pressure to create a significant torque before the nozzles initially open, which ensures that the compressor starts spinning at a rate at which the compressor will efficiently compress the air. If the turbine fails to attain a critical speed, then it is may not achieve enough in pressure in the valve to open it. The spring system also makes sure that the nozzle aperture is constantly adjusted in relation to the pressure and temperature in the heat chamber.

It also regulates the opening according to the running speed of the engine. It does this most at high speeds through the increased centripetal acceleration of the nozzle adjusters, causing them to move outwards, increasing the aperture for gas to escape at these speeds. This is beneficial because it increases the mass volume of air leaving the nozzles, and therefore the power generated in the reaction force. Since the air will be moving at high velocity already in this situation, the volume of air being moved can become a contributing factor to engine power. This also means that a larger heat source can be applied, since the heat input required to melt the internal components is increased if the internal components are subject to a high air flow which sloughs off the heat at a high rate. This increases the power to weight and power to cost ratio of the engine.

Gas Used in the Engine

In one configuration of the engine, Helium may be used as the working gas. Air and a variety of other gasses are also possible. Helium is advantageous since it is largely inert, and expands and contracts further per unit heat energy in or out than is the case with most other gasses apart from Hydrogen, which has safety issues.

Although the invention has been described with reference to a particular example, it should be appreciated that other configurations are also possible.

Design Using a Stationary Heat Chamber and Turbo Drive Arrangement

In this configuration, the heat chamber is not moving, but is simply delivering heat to air, which is moving, and is connected by piping to the input and output of the chamber via a one way valve system. This system controls the flow of air through the chamber according to the amount of heat and pressure, which the chamber is able to deliver to the air. If the chamber is hotter, and the pressure is higher, gas flow through the chamber is allowed to increase. No back flow of air is allowed due to the one way valve system, which is employed.

After the air is heated in a high temperature heat chamber, it is expelled through the valve, and is channelled into an impeller, which drives a compressor attached to the same shaft. The impeller and compressing turbine are connected in such a way that there is no air flow along their connecting axis. The air which has passed through the impeller travels through a heat sink system, and then through a regenerator system which picks up lost heat from the heat chamber. In this way the air is preheated it on its way into the compressor, which compresses the air and returns the air to the heat chamber to begin a new cycle.

It can be seen that this system follows all of the stages of the Carnot heat cycle that the first configuration does, only it doesn't have a revolving heat chamber. It still has a circulatory approach to gas flow, and it still has no requirement for crank-shaft style conversion of linear force into rotational torque. Typically, the channelling of gas through the impeller is tangential or near tangential to the impeller, however the gas flow might strike the impeller straight on in some cases. Even in these cases, the resultant forces created in the impeller are rotational and therefore must be tangential or near tangential to the axis of rotation.

The configuration could even employ an existing car or truck turbo, with little modification required to be made to the turbo.

Design Using Rotating Aligned Shut Off Vanes

In this configuration, a cylindrical compressor has a single helical reducing spiral vane, which takes air in with a large scoop on the front side, and releases it at a small round opening at its back side near the perimeter. This turbine then has a narrow solid neck region, separating it from another wider diameter region, which forms the front face of the heat chamber itself. In-between the two wider diameter regions, supporting the narrow neck, is a separating vane. This is entirely solid apart from a single curved slot, which is concentric with the perimeter, and of about 20 degrees in length. It is also aligned with, and of similar width to the small round opening mentioned earlier. There is also a hole in the front face of the heat chamber, which is aligned with, and the same size as the aforementioned hole, and the curved slot. The effect of all of this is that as the turbine and attached heat chamber rotates relative to the stationary vane, the exit to the helical vane is blocked by the close tolerance with the separating vane until it aligns with the curved slot. When this alignment occurs, the built up pressure in the helical compressing vane is released through the slot, into and through the aligned hole in the heat chamber, and is then immediately sealed off inside the heat chamber by the continued rotation of the turbine relative to the vane. The gas is then heated as per the first mentioned design, and escapes though the tangential nozzles, causing rotation in a similar way. All the other stages are the same as per the first mentioned design.

Designs Using Other Types of Compressor

As mentioned earlier, designs which utilise other types of compressor are also covered by this patent. These may include centrifugal compressors—by affixing the compressor such that the radial output airflow is contained within a vessel, and redirected towards a valve, similarly to previously mentioned designs. Use of axial fan compressors as a component in the design; whether single stage or multi stage; with or without stationary vanes, is also covered.

Power Transfer Configurations

One of the shafts could be simply extended through its bearing to form a drive shaft. The device, perhaps including a shaft seal to prevent gas escaping along the shaft. The device could then directly power an external load such as a pump, drive wheel etc.

Alternatively, one end of the engine could be adapted to include a magnetic coupling such that the interior is still totally sealed, but power is transmitted magnetically through a thin wall to a coupling magnetic drive shaft on the exterior.

Reverse Cycle Refrigeration/Heater Application

A feature of the Carnot cycle mentioned is that it can operate in reverse, such that mechanical work is applied to the system, and heat is removed from the external environment, to create a refrigeration effect. Since this work provides a heat flow in a given direction, this can be used to heat or cool, depending on where the heat is placed. This is an application of the device which can be utilised particularly easily in the case of the stationary heat chamber version mentioned above. It is even possible to use one Stirling engine, driven in the forward direction by an external heat source, to drive another one in reverse, creating a refrigerator or freezer powered by the first heat source, which could be Solar for instance.

What is claimed is:

1. A Stirling engine comprising:
   a heat chamber and heat sink filled with working gas, and a drive shaft, the engine being powered by an external heat source to utilize the Carnot heat cycle and variations in gaseous pressure to drive the shaft in rotation; and where the engine further comprises a compressor mounted on the drive shaft to move working gas from the heat sink into the heat chamber, and an outlet to release working gas from the heat chamber to the heat sink, the outlet being mounted on the drive shaft and directed such that the action of the released gas is substantially tangential to the axis of rotation of the drive shaft, to drive it in rotation and do useful work.

2. A Stirling engine according to claim 1, further comprising a valve located between the compressor and the heat chamber.

3. A Stirling engine according to claim 1, where the heat chamber is also mounted on the drive shaft to be driven in rotation.

4. A Stirling engine according to claim 1, where the gas that has been released from the outlet passes over the heat-sinks which extract heat and release it to the outside environment.

5. A Stirling engine according to claim 1, further comprising a regenerator to cool the gas as it proceeds from the heat chamber to the heat sink, and then warm the gas as it returns from the heat-sink towards the turbine.

6. A Stirling engine according to claim 1, where springs serve to tension the outlet closed.

7. A Stirling engine according to claim 1, where heat shields are used to keep as much heat as possible inside the heat chamber.

8. A Stirling engine according to claim 1, where a window is provided in the engine to allow heat to radiate onto the heat chamber.

9. A Stirling engine according to claim 8, where the window is located at the focal point of a solar concentrating dish.

10. A Stirling engine according to claim 1, where Helium is used as the working gas.

11. A Stirling engine according to claim 1, where the engine is used to power a generator.

12. A Stirling engine according to claim 1, where the drive shaft extends out of the engine to provide a mechanical coupling.

13. A Stirling engine according to claim 1, where the shaft employs a magnetic coupling.

* * * * *